United States Patent

Mackenzie

[15] 3,638,118
[45] Jan. 25, 1972

[54] DRUM INDICATOR

[72] Inventor: Elbert Kennedy Mackenzie, North Wales, Pa.

[73] Assignee: Electro-Mechanical Instrument Co., Inc., Perkasie, Pa.

[22] Filed: Mar. 14, 1969

[21] Appl. No.: 807,268

[52] U.S. Cl. ........................... 324/146, 324/151, 340/373
[51] Int. Cl. ........................... G01r 1/20, G01r 1/16
[58] Field of Search ........... 324/146, 147, 151, 156, 125; 340/373; 116/116, 57; 334/86; 325/455; 331/64

[56] References Cited

UNITED STATES PATENTS

| 2,495,326 | 1/1950 | Hansell | 325/455 X |
| 3,008,043 | 11/1961 | Caulk | 331/64 X |
| 2,779,442 | 1/1957 | Bacon | 324/125 UX |
| 3,074,060 | 1/1963 | Kadlec | 324/146 UX |
| 3,250,996 | 5/1966 | Fleetman | 324/146 |
| 3,417,731 | 12/1968 | Wronke et al. | 116/116 X |
| Re.26,349 | 2/1968 | Jackman | 340/373 |

FOREIGN PATENTS OR APPLICATIONS

| 1,182,342 | 11/1964 | Germany | 324/151 |

*Primary Examiner*—Alfred E. Smith
*Attorney*—Woodcock, Washburn, Kurtz & Mackiewicz

[57] ABSTRACT

In an electrical meter, the indicator includes a drum constructed of a low-density material to reduce the rotational inertia of the drum. The drum is mechanically coupled for rotation by an armature so that indicia on the drum represent the value of an applied electrical signal in accordance with the relative rotation of the drum.

12 Claims, 7 Drawing Figures

DRUM INDICATOR

BACKGROUND OF THE INVENTION

This invention relates to electrical meters and more particularly to an electrical meter having a drum-type indicator.

There exists a requirement for an electrical meter having a long flat scale and which can be driven from a low-level electrical signal. In particular, this need exists for use with electronic tuners of the voltage tuned type used, for example, in radio and TV sets. In voltage tuners, the air capacitor used in normal tuners is replaced by a variable resistor together with a solid-state voltage sensitive capacitor to obtain the desired tuning. In tuners using variable air capacitors, the mechanical position of the tuning knob is a fairly reliable indication of the frequency to which the tuner is tuned. Hence, tuners of that type merely provide a scale used in relation to the tuning knob to indicate the station tuning.

However, in voltage tuners the position of the tuning knob is not necessarily a reliable indication of tuning, particularly where standard grade variable resistors are used. In voltage tuners, there is, however, a voltage available which is a reliable indication of the station to which is tuned. It has been proposed to provide a meter type indicator which is responsive to this voltage to provide an indication of station tuning.

Some of the requirements of such a meter are that it be relatively simple, low cost and rugged.

The desired display for such a meter can be met by indicators of the drum type. Such indicators for other purposes are shown in U.S. Pat. Nos. 1,828,053, Kourtzman, and 2,910,036, Lasko, which show drum-type indicators for speedometers. Such drum-type indicators are not directly suitable for use in conjunction with an electrical meter because of the great inertia of the drums. Most electrical meter movements are reliably sensitive to input signals of a low level. The problem of driving a drum-type indicator of the type shown in the prior art with an electrical meter movement is formidable. In addition, the friction which is inherent in drum type indicators of the prior art makes them unsuitable for use in conjunction with an electrical meter movement.

SUMMARY OF THE INVENTION

In accordance with an important aspect of the present invention, there is provided an electrical meter having a very lightweight indicator including at least a portion of a drum. Indicia representing the values of signals applied to the meter are on the periphery of the drum.

In one embodiment of the invention, the indicator includes a drum having a helical pattern, or a helical stripe around the periphery of the drum. When viewed through a slot having the scale associated therewith, the rotation of the drum in response to the application of an input signal gives the effect of an advancing stripe which moves relative to the scale and provides an indication of the value of the applied input signal.

In another embodiment of the invention, the drum bears scale markings, numerals or characters, around the periphery thereof. When viewed from one side, the rotating drum indicates the value of the applied electrical signal by reason of the scale mark which is visible from that side.

In accordance with an important aspect of the invention, the indicator is a drum of extremely lightweight foamed plastic, for example, foamed polystyrene plastic.

In accordance with another aspect of the invention, the low-density plastic drum is mounted on a shaft which extends through the drum. The shaft, or arbor, together with the frame in which it is mounted are formed of metal having a different temperature coefficient of expansion that the material from which the drum is formed. In order to avoid the possible problem of distortion of the drum and shaft caused by differential temperature expansion, the drum is affixed to the arbor at only one point.

In accordance with another important aspect of the present invention, a viscous shock bearing is provided between the ends of the arbor or shaft. The viscous shock bearing provides added support and rigidity to the shaft under shock conditions. However, under normal meter operating conditions, there is not a third bearing surface which might interfere with the normal alignment of the shaft between the two end pivots. There is no mechanical friction between the viscous shock bearing and shaft.

Accordingly, it is one object of the present invention to provide a flat, straight scale electric meter with a readout which minimizes parallax.

It is another object of the present invention to provide a long scale electric meter with a shallow, compact housing and having a drum type indicator which can be rotated through up to approximately 270° by the meter movement.

It is another object of the present invention to provide a meter having a rugged, simple construction for commercial and industrial service.

It is another object of the present invention to provide a low cost meter having a construction which is suitable for large quantity production and for low power consumption in service.

It is another object of the present invention to provide a meter which can be easily read by nontechnical users without ambiguity, can be read at a distance, can be read in direct sunlight (an attribute not present, for example, in optical projection meters) and which can be easily adapted for multiple scales.

It is another object of the present invention to provide an electrical meter which is compatible with voltage tuning of TV, radios, amplifiers, electronic circuitry and automotive tachometers and which avoids precision potentiometer shaft position indication.

It is another object of the present invention to provide a meter having a semidigital readout of an applied analog signal.

It is another object of the present invention to provide an electrical meter which is capable of near critical damping. The meter is capable of near critical damping because the drum has a low moment of inertia for a given size of the indicator.

It is another object of the present invention to provide a drum-type meter in which the drum can be driven through up to 270° of rotation by a moving-magnet-type meter movement having a normal usable rotational range of approximately 80°.

It is another object of the present invention to provide an indicator which is suitable for use with a remote tuner of the variable voltage type.

The foregoing and other objects, features and advantages of the invention will be apparent from the following more detailed description and appended claims.

DESCRIPTION OF THE PRINCIPAL EMBODIMENT

Figure 1:
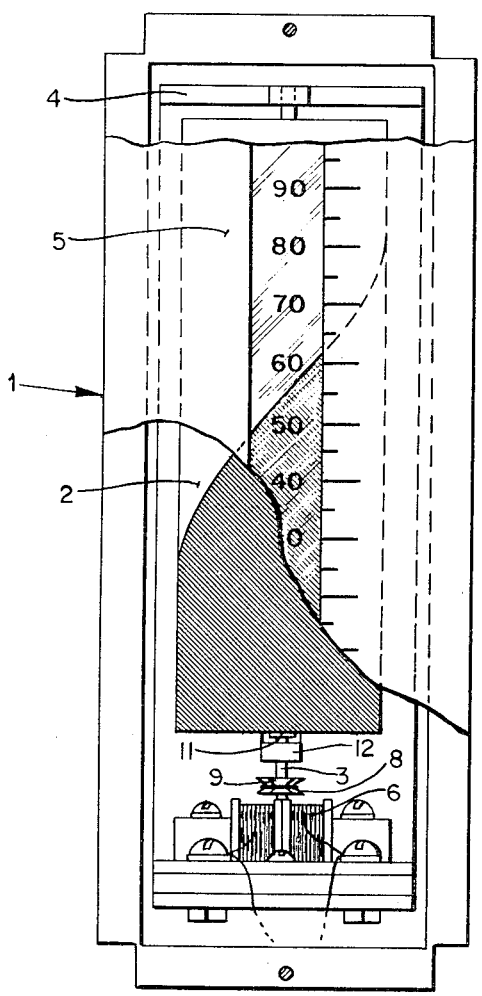
FIG. 1 is a front view, partially broken away, of one embodiment of the invention.
Figure 2:
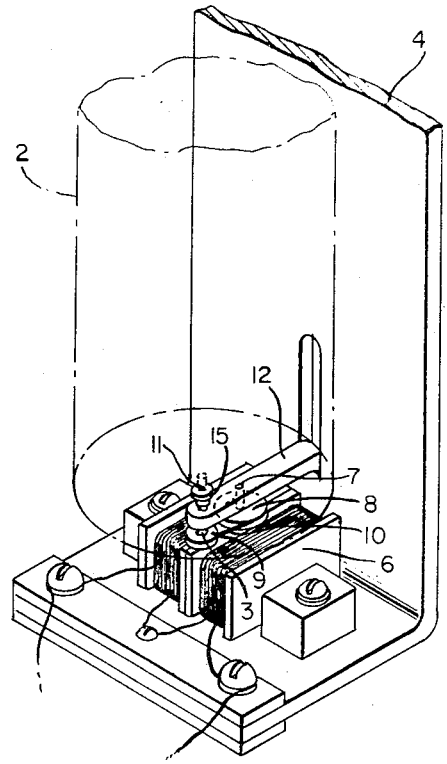
FIG. 2 is a partial perspective view of this embodiment.

FIGS. 1 and 2 show a meter which includes a rectangular case 1. The indicator includes a drum 2 formed of light weight foamed polystyrene plastic. In one actual embodiment of the invention, a drum 4¼ inches long having a 1¼ inch diameter was used. The drum has ⅛-inch thick walls and is hollow. The particular advantages of the present invention will be better understood when it is realized that such a drum weighs only approximately 3 grams. Such a drum has an extremely low rotational inertia and makes the drum suitable as an indicator which can be driven by a moving magnet movement.

The drum is mounted on a shaft or arbor 3 which is journaled at either end in the frame 4.

The drum shown in FIG. 1 has a helical pattern. The surface of the drum is divided into two differently colored or shaded portions. The dividing line between two portions is a helical line around the surface of the drum. The drum is viewed through a slot in the faceplate 5 which has been broken away for ease of viewing. The faceplate which is partially transparent carries a scale. The faceplate 5 is fastened to the case 1 which encloses the meter. As the drum 2 rotates, the pattern on the surface of the drum presents an advancing stripe relative to the scale.

The drum-type indicator of this type is particularly suitable for forming a vivid display, particularly if highly reflective colors are used on he drum. Such a display particularly meets the requirements of easy readability at a distance and unambiguous reading by nontechnical users with minimum parallax.

In lieu of the two-color pattern shown in FIG. 1, a helical line can be imprinted on the drum or a dashed or dotted line could be used to obtain other effects.

The drum is driven by a meter movement of the type which is capable to rotating the drum through 270°. This type meter movement is described and claimed in U.S. Pat. No. 3,250,996, Fleetman. It includes a permanent magnet (not shown) mounted for movement within the interior of a coil assembly 6 having two windings. The permanent magnet is disposed within slots of this coil assembly and is mounted on the driving arbor 7. Change in the electrical signal applied to the coils produces current flow in the coils which develops a magnetic field producing a torque on the driving arbor 7. The electrical coils can take many forms well known in the prior art and, as used in this specification, the term "electrical coil" includes a quarterturn coil which is a strip of wire (alternatively, it may be of formed metal).

A driving pulley 8 is mounted on the driving arbor 7 and rotates therewith. The driving pulley 8 is of large diameter compared with the diameter of a driven pulley 9 secured to the arbor of shaft 3 which extends through the drum. The driving pulley, or member, 8 together with the driven pulley, or member, 9 form a movement multiplying means which includes the flexible cord 10 secured at one end to the driving pulley 8 and at the other end to the driven pulley 9. Thus, a small movement of the driving pulley 8 produces a relatively large proportional movement of the driven pulley 9 and of the drum.

It should be noted that the shaft 3 extends through the coils and is pivoted in the frame 4. The shaft is similarly pivoted at its other end. Commonly, jeweled screws are used for the pivots.

It is quite important that the shaft 3 extend all the way through the drum. This is as opposed to the construction in which two stub shafts might be affixed to either end of the drum. The provision of a single shaft which extends all the way through the drum solves two problems. First there is no problem of good axial alignment of two stub shafts. Secondly, the shaft is constructed of a metal having a similar thermal coefficient of expansion to that of the frame. Therefore, during temperature changes there is no problem of excessive end play, or binding, at the pivots.

The provision of a single shaft which extends through the drum does present one problem which is solved by an important feature of the invention. This feature is that the drum is affixed to the shaft only at one point, at the point 11 in this case. If the drum were affixed to the shaft at both ends, the different temperature coefficients of expansion between the drum and the shaft might cause buckling or distortion of the drum and/or the shaft.

Figure 3:
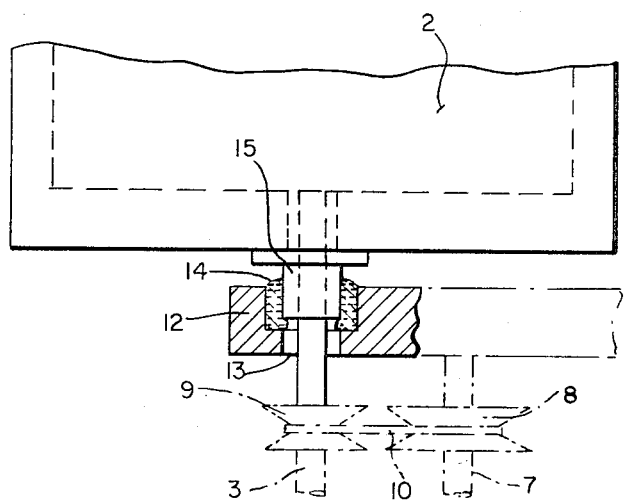
FIG. 3 shows the details of the viscous shock bearings.

The shaft 3 is of extremely small diameter, in the present case the diameter being approximately three sixty-fourths fourths of an inch. The unsupported length of this shaft between the end of the drum and the pivot point makes the shaft particularly susceptible to damage by shock. In order to prevent shock damage, a viscous shock bearing included in the member 12 is provided. Referring to FIG. 3, the member 12 has a hole 13 through which the shaft 3 extends. The hole 13 is formed into a cup which holds the viscous damping fluid 14, in this case 30,000 viscosity silicone oil. Of course, in meters having drums of different diameters, different viscosity oil will be required.

A damping collar 15 is affixed to the shaft 3 and to the drum 2. The damping collar 15 together with the cup formed into the member 12 will retain the viscous damping fluid 14 and form a good shock bearing. Under shock, the silicone oil provides a good resistance to relative movement between the damping collar 15 and the cup in the member 12. However, under normal operating conditions, there is no mechanical contact and no mechanical friction at the viscous shock bearing.

A restoring magnet, or hairspring, of the type shown in the aforementioned Fleetman patent, will also normally be provided. The restoring magnet (not shown in the drawings) additionally serves to tension the driving cord at the zero pointer position.

Modifications of the Invention

Figure 4:
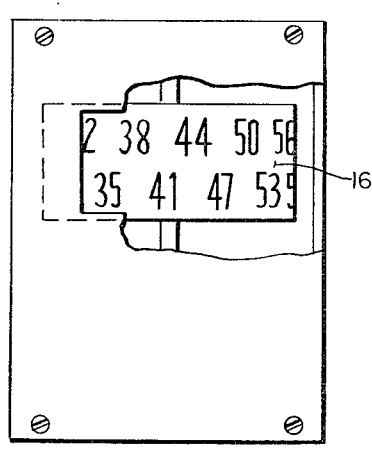
FIG. 4 shows a modification of the invention.

Referring to FIG. 4, there is shown a modification wherein the drum 16 is much shorter in length and wherein the drum has two scales, each scale being in a diametral plane of the drum. The same type of meter movement is used to drive the drum. An index may be provided on the frame and juxtaposed with respect to the drum 16 so that the markings on the drum can be read in a diametral plane as the drum rotates.

Alternatively, the slot in the frame could be made smaller so that only one of the numbers is visible at a time. In this case, the meter provides a type of digital readout which is particularly suitable in many applications in which a digital readout of an analog input signal is required.

In another alternative embodiment of the invention, the 270° meter movement of FIGS. 1 and 4 is replaced by a more conventional meter movement which provides about 100° of rotation of the drum. Such a movement is shown, for example, in the copending application of Hobart H. Fleetman, Ser. No. 807,267, filed Mar. 14, 1969. Such a meter is suitable for use in many applications. For the same scale length, such a meter presents a sharper angle of line as viewed through the slot in the case. This limits the accuracy of reading of the meter but in many cases this is not a severe limitation. Of course, where a shorter scale is suitable, the foregoing will not be a problem at all. In this case, this embodiment of the invention provides a good, lost cost type indicator for many applications.

As another modification, the FIG. 1 embodiment can be modified so that the shaft on which the drum is mounted is separate from the driven arbor upon which the driven pulley 9 is mounted.

Figure 5:
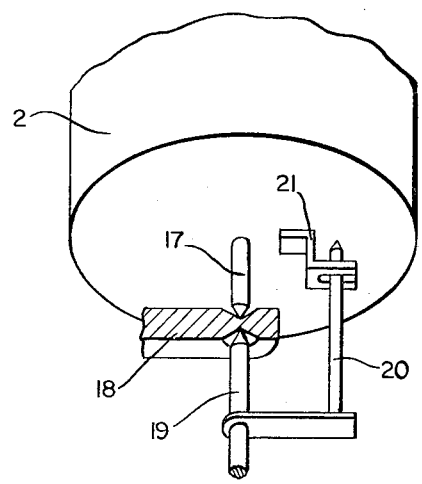
FIG. 5 shows a modification of the drive connection of the invention.

Referring to FIG. 5, the drum 2 is mounted on a shaft 17 which is journaled in the mounting bracket 18. The driven arbor 19 of the meter movement is journaled in the other side of the bracket 18. The driven arbor 19 has the driven pulley (not shown) mounted thereon. Also mounted on the driven arbor 19 is a yoke 20 which is in the shape shown to give it freedom to rotate without bumping the bracket 18. A forked member 21 is affixed to the drum. The yoke 20 is positioned in the fork so that as the driven arbor 19 rotates, the drum is rotated. The provision of the forked member 21 is rather important since it is not feasible to provide a fixed contact between he yoke 20 and the drum 2. Any misalignment between the shafts 17 and 19 or motion therebetween would cause binding.

Figures 6, 7:
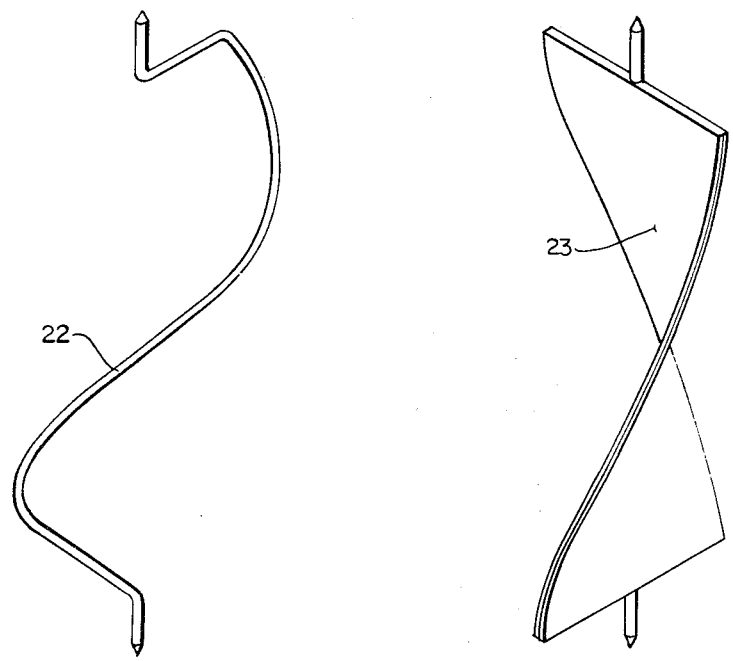
FIG. 6 shows a modification of the indicator.
FIG. 7 shows another modification of the indicator.

Modifications of the indicator are shown in FIGS. 6 and 7. In FIG. 6, the portion of the drum which is used as an indicator includes only the lightweight material 22 in the form of a helix rotatable about its central axis. In FIG. 7, the indicator is a strip of material 23 in the helical form about its central longitudinal axis. The indicators of FIGS. 6 and 7 can both be mounted for rotation similar to the manner in which the drum 2 is mounted for rotation in the FIGS. 1 and 2 embodiment.

While there has been reference to a helical pattern or a helical structure previously, this does not necessarily require that a true helix be employed. A nonuniform helix may be particularly suitable to provide different scale factors. Therefore, it will be understood that helical may include the use of a nonuniform helix.

While a particular embodiment of the invention has been described, it will be understood that various modifications may be made. The appended claims are, therefore, intended to cover such modifications within the true spirit and scope of the invention.

What is claimed is:

1. An electrical meter for continuously indicating the value of electrical signal applied thereto comprising:

electrical coil means, said electrical signal being applied to said electrical coil means, an armature magnetically coupled to said electrical coil means, a driving arbor, said armature being mounted on said driving arbor, a driven arbor driven by said driving arbor said driven arbor being pivoted in jeweled bearings, and an indicator including at least a portion of a drum mounted on said rotatable arbor, said drum being constructed of a low-density foamed plastic material to reduce the rotational inertia of said drum, said drum being mechanically coupled for rotation by said armature to represent the value of said signal in accordance with the relative rotation of said frame.

2. The meter recited in claim 1 wherein said low-density foamed plastic material is foamed polystyrene plastic.

3. The meter recited in claim 1 wherein said indicator is a drum mounted on said driven arbor extending through the length of said drum, and a frame, said arbor being pivoted in said frame.

4. The meter recited in claim 3 wherein said arbor and said frame are constructed of materials having similar thermal coefficients of expansion, said similar coefficients of expansion being different than the thermal coefficient of said low density material, said drum being rigidly fixed to said driven arbor at a single point so as to permit mutually independent expansion and contraction of said drum and said arbor with temperature changes.

5. The meter recited in claim 3 wherein said driven arbor is pivoted at both ends in said frame, and a bearing supporting said driven arbor at a point between said pivots, said bearing including a cup for viscous fluid which supports said arbor.

6. The meter recited in claim 1 wherein said indicator is a drum mounted on said driven arbor, a frame, said driven arbor being pivotally mounted in said frame, said drum having indicating marks in a diametral plane around the periphery of said drum, and an index means mounted on said frame and juxtaposed with respect to said drum so that said markings can be read in a diametral plane as said drum rotates.

7. The meter recited in claim 1 wherein said indicator is a drum mounted on said driven arbor, a frame, said driven arbor being pivotally mounted in said frame, and said drum having indicia helically around the periphery thereof, said frame having a slot which is axially juxtaposed to said markings.

8. The meter recited in claim 7 further including a scale which is stationary to said slot so that said helical markings on said drum can be read with respect to said scale.

9. The meter recited in claim 1 wherein said indicator is a lightweight material in the form of a helix rotatable about its central axis.

10. The meter recited in claim 1 wherein said indicator is a strip of material constructed in a helix about its central longitudinal axis.

11. The electrical meter of claim 1 further comprising:

multiplying driving means for said arbors for multiplying the rotation of said driven arbor for a given rotation of said driving arbor.

12. The electrical meter of claim 11 wherein said multiplying driving means includes:

a pulley mounted on said driven arbor, a driving member mounted on said driving arbor and having an edge rotatable about the driving arbor, said edge moving in a arcuate path about said driving arbor, the radius of said arcuate path being greater than the radius of said pulley, and a single pliant driving cord affixed at one end to the periphery of said pulley and at the other end to said edge of said driving member.

* * * * *